United States Patent
Buyukdura et al.

(10) Patent No.: US 12,309,641 B2
(45) Date of Patent: May 20, 2025

(54) SUPPORTING MOVEMENT OF 5G PROTOCOL DATA UNIT SESSIONS TO HIGHER PRIORITY NETWORK ROUTES

(71) Applicant: AT&T Intellectual Property I, L.P., Atlanta, GA (US)

(72) Inventors: Feza Buyukdura, Fairview, TX (US); Arnold Schrider, Mercer Island, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 448 days.

(21) Appl. No.: 17/821,787

(22) Filed: Aug. 23, 2022

(65) Prior Publication Data
US 2024/0073744 A1 Feb. 29, 2024

(51) Int. Cl.
| | |
|---|---|
| *H04W 28/08* | (2023.01) |
| *H04W 40/02* | (2009.01) |
| *H04W 40/20* | (2009.01) |
| *H04W 40/30* | (2009.01) |
| *H04W 40/34* | (2009.01) |

(52) U.S. Cl.
CPC ... *H04W 28/0967* (2020.05); *H04W 28/0992* (2020.05); *H04W 40/02* (2013.01); *H04W 40/20* (2013.01); *H04W 40/30* (2013.01); *H04W 40/34* (2013.01)

(58) Field of Classification Search
CPC ......... H04W 28/0967; H04W 28/0992; H04W 40/02; H04W 40/20; H04W 40/30; H04W 40/34
See application file for complete search history.

(56) References Cited

U.S. PATENT DOCUMENTS

2020/0382605 A1* 12/2020 Ouyang ................ H04W 40/20
2023/0363031 A1* 11/2023 Gundavelli ........... H04W 76/16

\* cited by examiner

*Primary Examiner* — Thomas R Cairns

(57) ABSTRACT

In one example, a method includes detecting that a user equipment device has moved to a location in a telecommunications network in which a first network route is available, where the first network route has a higher priority than a second network route with which an application executing on the user equipment device has established a current protocol data unit session, determining that the application should switch the current protocol data unit session to the first network route, and supporting the application in switching the current protocol data unit session from the second network route to the first network route.

20 Claims, 4 Drawing Sheets

SUPPORTING MOVEMENT OF 5G PROTOCOL DATA UNIT SESSIONS TO HIGHER PRIORITY NETWORK ROUTES

The present disclosure relates generally to mobile media networks, and relates more particularly to devices, non-transitory computer-readable media, and methods for supporting movement of Fifth Generation (5G) protocol data unit sessions to higher priority network routes to maintain optimized quality of service.

BACKGROUND

Mobile devices (e.g., smart phones, tablet computers, wearable devices, and the like) are often used to engage with network connected applications, such as streaming music and video applications, gaming applications, and others. At the same time, many of these applications are offering more immersive experiences, such as gaming applications that leverage extended reality (XR) technology, or streaming video applications that can control co-located Internet of Things (IoT) devices. Different applications have different requirements for uplink and downlink latency, throughput, and packet loss rates depending on quality of experience (QoE) targets and/or other performance requirements. Routes (or protocol data unit sessions) for transporting application traffic may be selected to optimize the allocation of network resources while meeting performance targets. A route is typically identified by a network slice identifier (S-NSSAI) and a data network name (DNN).

A "network slice" is a set of network resources that collectively provide an end-to-end network that is tailored to fulfill specific performance requirements. For instance, a plurality of network slices may be configured, where each network slice may provide different performance with respect to one or more key performance indicators (or "KPIs," e.g., throughput, latency, packet loss, etc.). Network slices may also be configured to address the needs of specific applications or types of applications (e.g., providing high upload speeds for streaming high bitrate video, providing encryption for the transmission of sensitive data such as data streams generated by health monitoring sensors, etc.). In 5th generation (5G) mobile networks, a "network slice" is understood to refer even more specifically to a protected channel for one or more devices to privately communicate with a radio access network (RAN).

SUMMARY

In one example, the present disclosure describes a device, computer-readable medium, and method for supporting movement of Fifth Generation (5G) protocol data unit sessions to higher priority network routes to maintain optimized quality of service. For instance, in one example, a method performed by a processing system including at least one processor includes detecting that a user equipment device has moved to a location in a telecommunications network in which a first network route is available, where the first network route has a higher priority than a second network route with which an application executing on the user equipment device has established a current protocol data unit session, determining that the application should switch the current protocol data unit session to the first network route, and supporting the application in switching the current protocol data unit session from the second network route to the first network route.

In another example, a non-transitory computer-readable medium stores instructions which, when executed by a processing system, including at least one processor, cause the processing system to perform operations. The operations include detecting that a user equipment device has moved to a location in a telecommunications network in which a first network route is available, where the first network route has a higher priority than a second network route with which an application executing on the user equipment device has established a current protocol data unit session, determining that the application should switch the current protocol data unit session to the first network route, and supporting the application in switching the current protocol data unit session from the second network route to the first network route.

In another example, a device includes a processing system including at least one processor and a computer-readable medium storing instructions which, when executed by the processing system, cause the processing system to perform operations. The operations include detecting that a user equipment device has moved to a location in a telecommunications network in which a first network route is available, where the first network route has a higher priority than a second network route with which an application executing on the user equipment device has established a current protocol data unit session, determining that the application should switch the current protocol data unit session to the first network route, and supporting the application in switching the current protocol data unit session from the second network route to the first network route.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
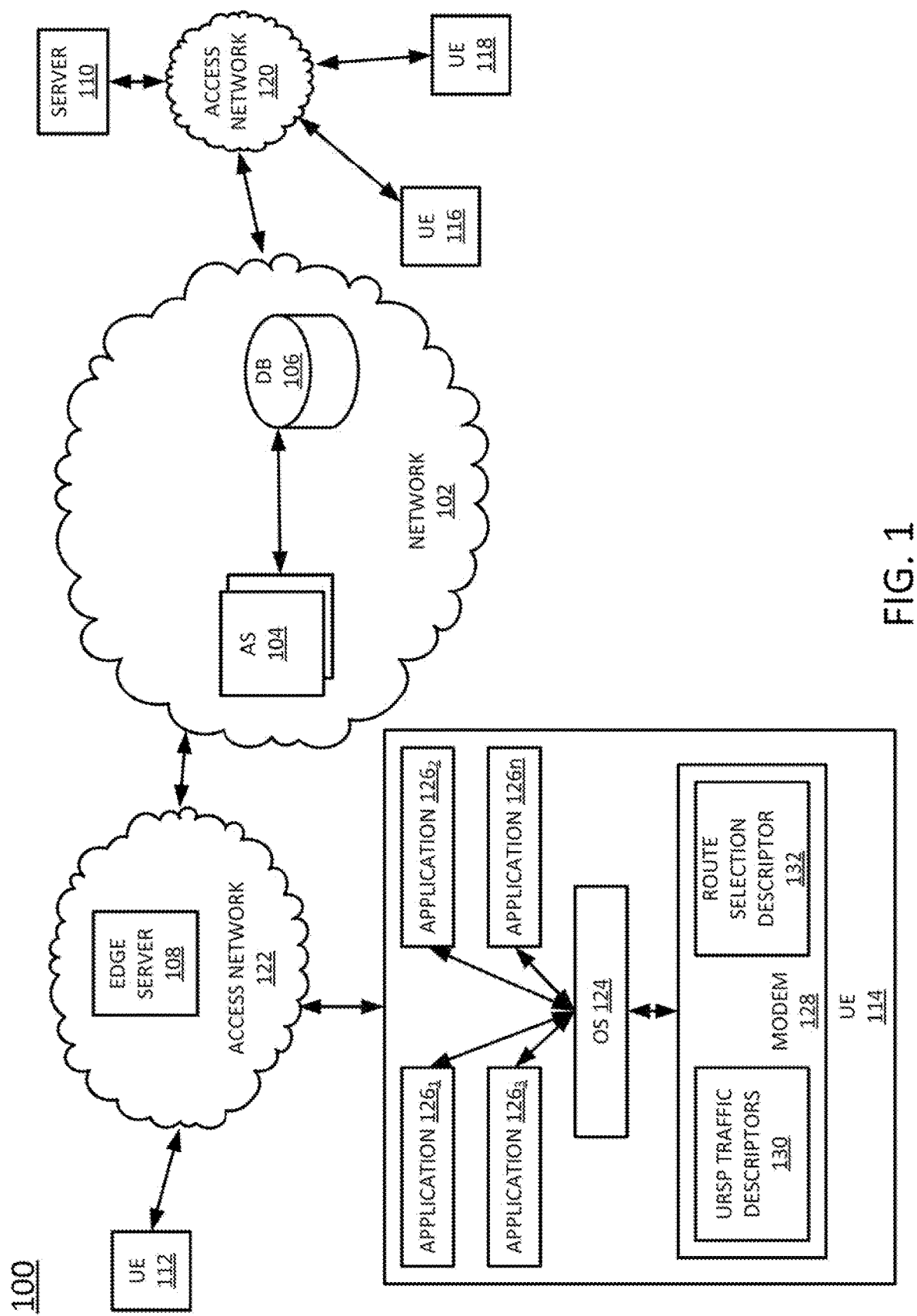
FIG. 1 illustrates an example system in which examples of the present disclosure may operate.

In one example, the present disclosure supports movement of Fifth Generation (5G) protocol data unit sessions to higher priority network routes to maintain optimized quality of service. As discussed above, mobile devices (e.g., smart phones, tablet computers, wearable devices, and the like) are often used to engage with network connected applications, such as streaming music and video applications, gaming applications, and others. At the same time, many of these applications are offering more immersive experiences, such as gaming applications that leverage extended reality (XR) technology, or streaming video applications that can control co-located Internet of Things (IoT) devices. Different applications have different requirements for uplink and downlink latency, throughput, and packet loss rates depending on quality of experience (QoE) targets and/or other performance requirements. Routes (or protocol data unit sessions) for transporting application traffic may be selected to optimize the allocation of network resources while meeting performance targets. A route is typically identified by a network slice identifier (S-NSSAI) and a data network name (DNN).

A "network slice" is a set of network resources that collectively provide an end-to-end network that is tailored to fulfill specific performance requirements. For instance, a plurality of network slices may be configured, where each network slice may provide different performance with respect to one or more key performance indicators (or "KPIs," e.g., throughput, latency, packet loss, etc.). Network slices may also be configured to address the needs of specific applications or types of applications (e.g., providing high upload speeds for streaming high bitrate video, providing encryption for the transmission of sensitive data such as data streams generated by health monitoring sensors, etc.). In 5th generation (5G) mobile networks, a "network slice" is understood to refer even more specifically to a protected channel for one or more devices to privately communicate with a radio access network (RAN). Thus, although "network slice" or simply "slice" is a term of art within the protocol definitions of 5G mobile networks, "network slice" as understood within the context of the present disclosure encompasses both the 5G usage and broader network configurations across protocols and usage.

In the current 5G network slice implementation, the user equipment route selection policy (URSP) defines how traffic from different applications is routed to different 5G protocol data unit (PDU) sessions. Each 5G session is marked with the slice ID (S-NSSAI) and DNN. For a given flow of traffic (identified by an application or a set of applications on the user equipment, or UE), the URSP can provide multiple route options each having different priority. During the initial connection setup from an application, the URSP will typically select the highest priority route available (e.g., highest priority slice ID/DNN based on PDU session). If the PDU session cannot be established with the highest priority route, then the URSP will select the next highest priority route or default to match all URSP rules if no next highest priority route is defined or available.

However, once a connection is established on a PDU session, the UE typically will not inform the relevant applications when/if a higher priority route becomes available. Thus, during the PDU session, the UE may move to a location where higher priority routes become available, but the applications will not be able to take advantage of these higher priority routes.

Examples of the present disclosure configure a 5G UE device to automatically inform applications executing on the UE device when higher priority routes are detected (e.g., become available upon the UE device moving to a new location) and to provide the applications with the option to move their connections from their current routes to one of the higher priority routes. In one example, when the UE device moves to a location in which a new route (e.g., new slice ID and/or DNN) is available or permitted, the 5G core network may inform the UE device of the availability of the new route (e.g., new slice ID and/or DNN).

In another example, the UE device may be notified of the new route through one or more location criteria in the URSP route selection descriptor. In this case, the one or more location criteria tell the UE device the location in which a given URSP rule is allowed and prevent the UE device from establishing PDU sessions when the UE device is used outside of an allowed location. According to examples of the present disclosure, the reverse may be implemented, i.e., when the UE device moves to a location defined in the one or more location criteria as permitting the use a URSP rule, then the UE device will inform the applications executing on the UE device that a new route is available and provide an option for the applications to switch their connections to the PDU session associated with the new route. These and other aspects of the present disclosure are described in greater detail below in connection with the examples of FIGS. 1-4.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, or an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an Internet Service Provider (ISP) network.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, 3 rd party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one particular example, at least one of the access network 120 and access network 122 comprises a 5G cellular access network. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

Figure 4:
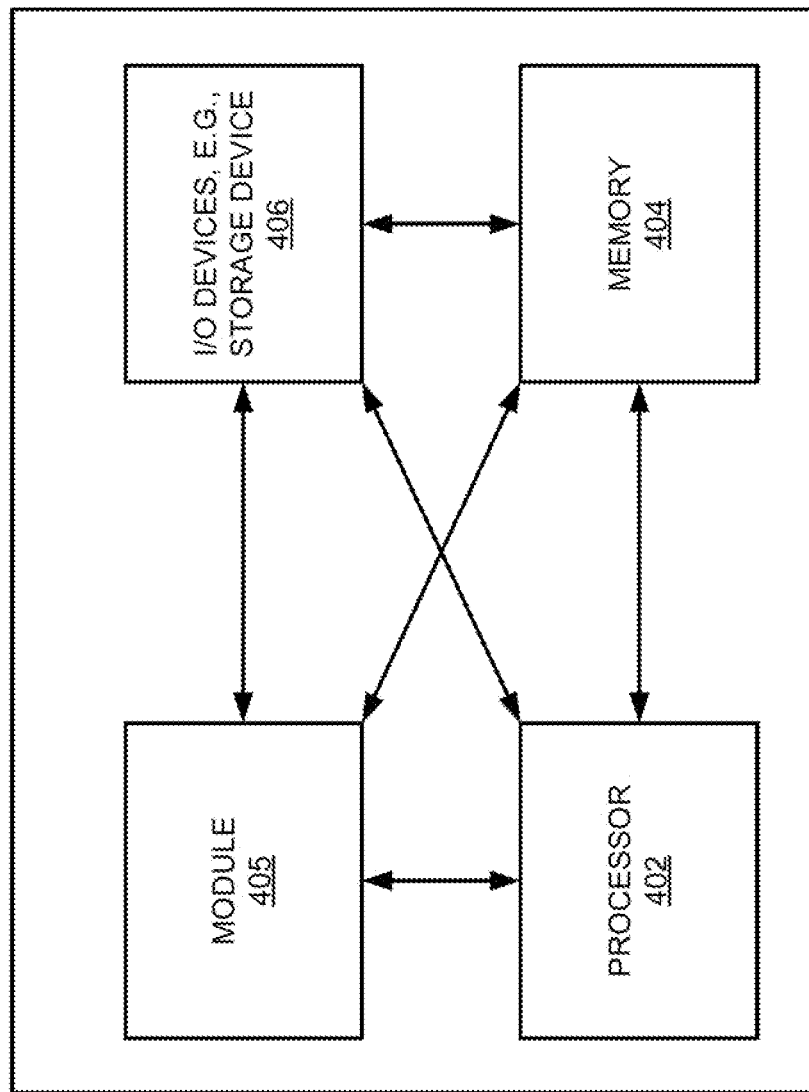
FIG. 4 depicts a high-level block diagram of a computing device specifically programmed to perform the functions described herein.

In accordance with the present disclosure, network 102 may include one or more application servers (AS) 104, each of which may comprise a computing system or server, such as computing system 400 depicted in FIG. 4, and may be configured to provide one or more operations or functions in connection with supporting a network connected application. For instance, one AS 104 may support a service that streams immersive video, while another AS 104 may support a service that provides an XR gaming experience, and the like. The network 102 may also include one or more databases (DBs) 106 that are communicatively coupled to the AS 104.

In one example, at least one AS 104 may comprise a physical storage device (e.g., a database server), to store data for transmission to and/or data transmitted from UEs 112, 114, 116, or 118. For instance, if an AS 104 supports an application used in a hospital for monitoring patients, one or more of the UEs 112, 114, 116, or 118 may transmit measurements of patient health metrics (e.g., blood pressure, heart rate, blood sugar, temperature, etc.) to the AS 104, which may in turn process the data and provide responsive instructions to the UEs 112, 114, 116, or 118 (e.g., alarms or recommended actions when the patient health metrics meet certain criteria). Alternatively, if an AS 104 supports an application for streaming video, the AS 104 may store profiles for application subscribers and video content that can be streamed over the application to the UEs 112, 114, 116, or 118.

In one example, the DB 106 may store any of the above data, and the AS 104 may retrieve the data from the DB 106 when needed. For ease of illustration, various additional elements of network 102 are omitted from FIG. 1.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure. Thus, although only a single AS 104 and a single DB 106 are illustrated in FIG. 1, it should be noted that any number of servers and any number of databases may be deployed, and which may operate in a distributed and/or coordinated manner as a processing system to perform operations in connection with the present disclosure.

In one example, access network 122 may include an edge server 108, which may comprise a computing system or server, such as computing system 400 depicted in FIG. 4, and may be configured to provide one or more operations or functions for in connection with supporting a network connected application.

Figure 3:
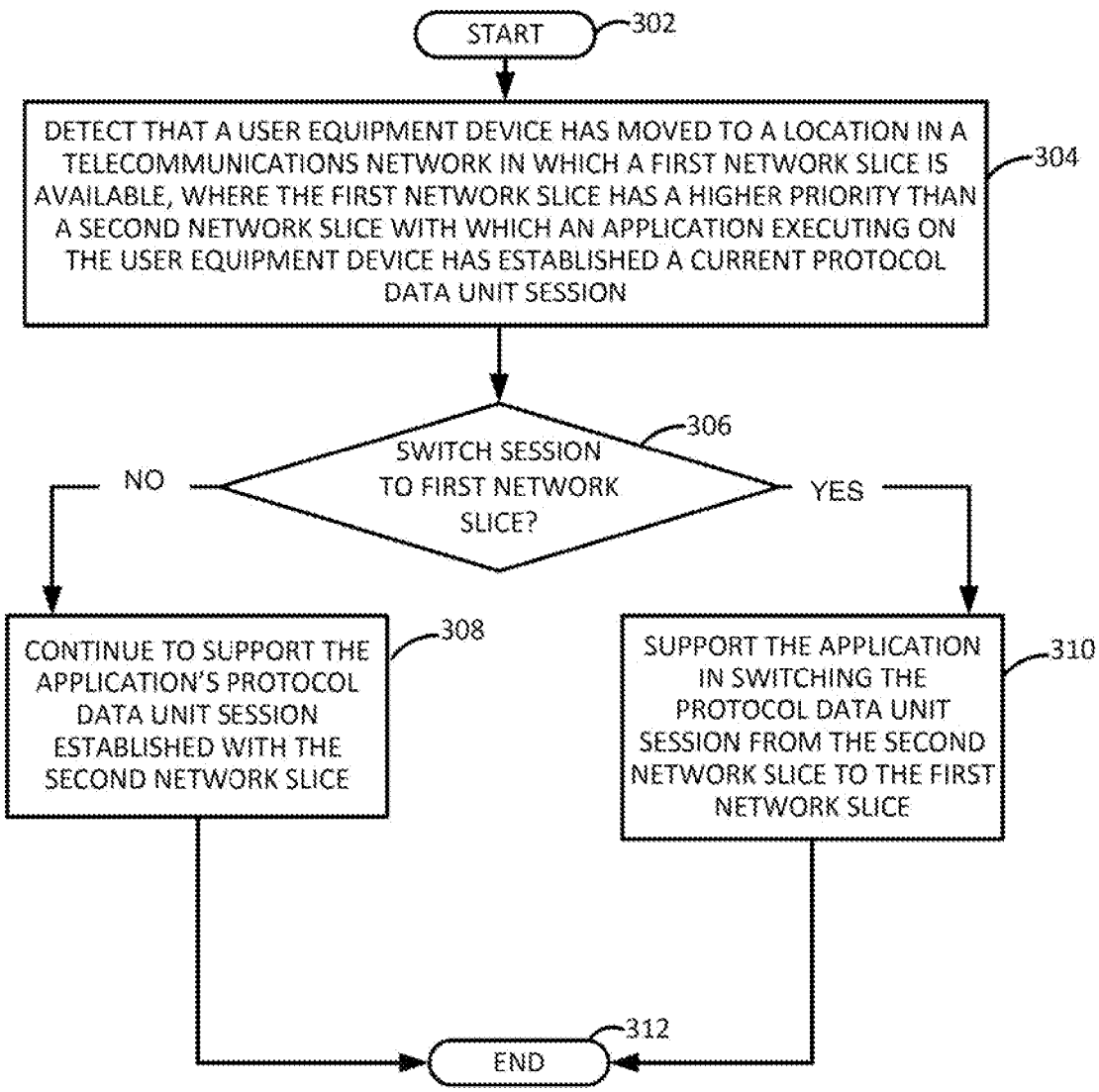
FIG. 3 illustrates a flowchart of an example method for establishing a protocol data unit session in accordance with the present disclosure.

In one example, the access network 120 may be in communication with a server 110 and with one or more user equipment devices (UEs), e.g., UEs 116 and 118. Similarly, access network 122 may be in communication with UEs, e.g., UEs 112 and 114. Access networks 120 and 122 may transmit and receive communications between server 110, user endpoint devices 112, 114, 116, and 118, application server(s) (AS) 104, components of network 102, devices reachable via the Internet in general, and so forth. In one example, any or all of the UEs 112, 114, 116, and 118 may comprise a mobile device, a cellular smart phone, a wearable computing device (e.g., smart glasses, a virtual reality (VR) headset or other types of head mounted display, or the like), a laptop computer, a tablet computer, or the like. In one example, any or all of the UEs 112, 114, 116, and 118 may comprise a computing system or device, such as computing system 400 depicted in FIG. 4, and may be configured to provide one or more operations or functions in connection with examples of the present disclosure for establishing a protocol data unit session, as described herein. For instance, an example method 300 for establishing a protocol data unit session is illustrated in FIG. 3 and described in greater detail below.

In one example, server 110 may comprise a network-based server for providing services in connection with a network connected application. In this regard, server 110 may comprise the same or similar components as those of AS 104 and may provide the same or similar functions. Thus, any examples described herein with respect to AS 104 may similarly apply to server 110, and vice versa. In particular, server 110 may be a component of a system for providing services in connection with a network connected application which is operated by an entity that is not a telecommunications network operator. For instance, a provider of a network connected application may operate server 110 and may also operate edge server 108 in accordance with an arrangement with a telecommunication service provider offering edge computing resources to third-parties. However, in another example, a telecommunication network service provider may operate network 102 and access network 122, and may also provide a system via AS 104 and edge server 108. For instance, in such an example, the system embodied in the AS 104 may comprise an additional service that may be offered to subscribers, e.g., in addition to network access services, telephony services, traditional television services, media content delivery service, and so forth.

In an illustrative example, at least some of the UEs 112, 114, 116, and 118 may be configured in a manner similar to the UE 114, illustrated in FIG. 1 in further detail. As shown, the UE 114 may generally comprise an operating system (OS) 124, one or more network connected applications $126_1$-$126_n$ (hereinafter individually referred to as an "application 126" or collectively referred to as "applications 126") which a user of the UE 114 may engage via software installed on user endpoint device 114, and a modem 128 which may establish one or more sessions between the applications 126 and the network 102 (e.g., between an application 126 and an application server 104).

The modem 128 may further include a list of URSP traffic descriptors 130 and a route selection descriptor 132. The URSP traffic descriptors 130 describe the types of traffic associated with applications executing on the UE 114, while the route selection descriptor 132 describes the available routes that the traffic may traverse in the UE's current location. The URSP traffic descriptors 130 and the route selection descriptor 132 communicate with the applications 126 executing on the UE 114 through the OS 124. When the UE 114 detects that the UE 114 has moved to a location where a localized network route is now available or allowed to be used (where the localized network route may be associated with a network route that has a higher priority, or provides improved service, relative to network routes to which the applications 126 are currently connected), the modem 128 may inform the applications 126, through the OS 124, of the availability of the localized network route and provide the applications 126 with the option to switch their connections to the localized network route.

In conventional 5G slicing implementations, all RAN nodes (e.g., gNodebs) in the system 100 might be configured with the 5G network slice IDs of the network slices supported by the RAN nodes. If a RAN node is not configured to support a particular network slice, then when a UE 112, 114, 116, or 118 attached to the RAN node tries to establish a PDU session with that particular network slice, the session will be rejected. 5G network slicing can be implemented in localized areas where differentiated RAN treatment is applied to specific applications when a UE 112, 114, 116, or 118 is in the RAN coverage of the localized areas. This requires the UE 112, 114, 116, or 118 to establish a PDU session with the network slice of a localized area. The specific applications may still be used outside of the localized area (e.g., in the macro network), but the PDU session may be established with or switched to a network slice that does not apply differentiation.

Some conventional 5G slicing implementations may configure the localized network slice IDs on all macro network RAN nodes (which may number in the tens of thousands), but may not configure the localized network slices to apply differentiation. Differentiation in this case is only configured on the RAN nodes within the localized area. However, the number of localized network slice implementation instances can, in some cases, exceed a maximum number of network slices that a RAN node can support in the macro network, so this approach is not always feasible.

Figure 2:
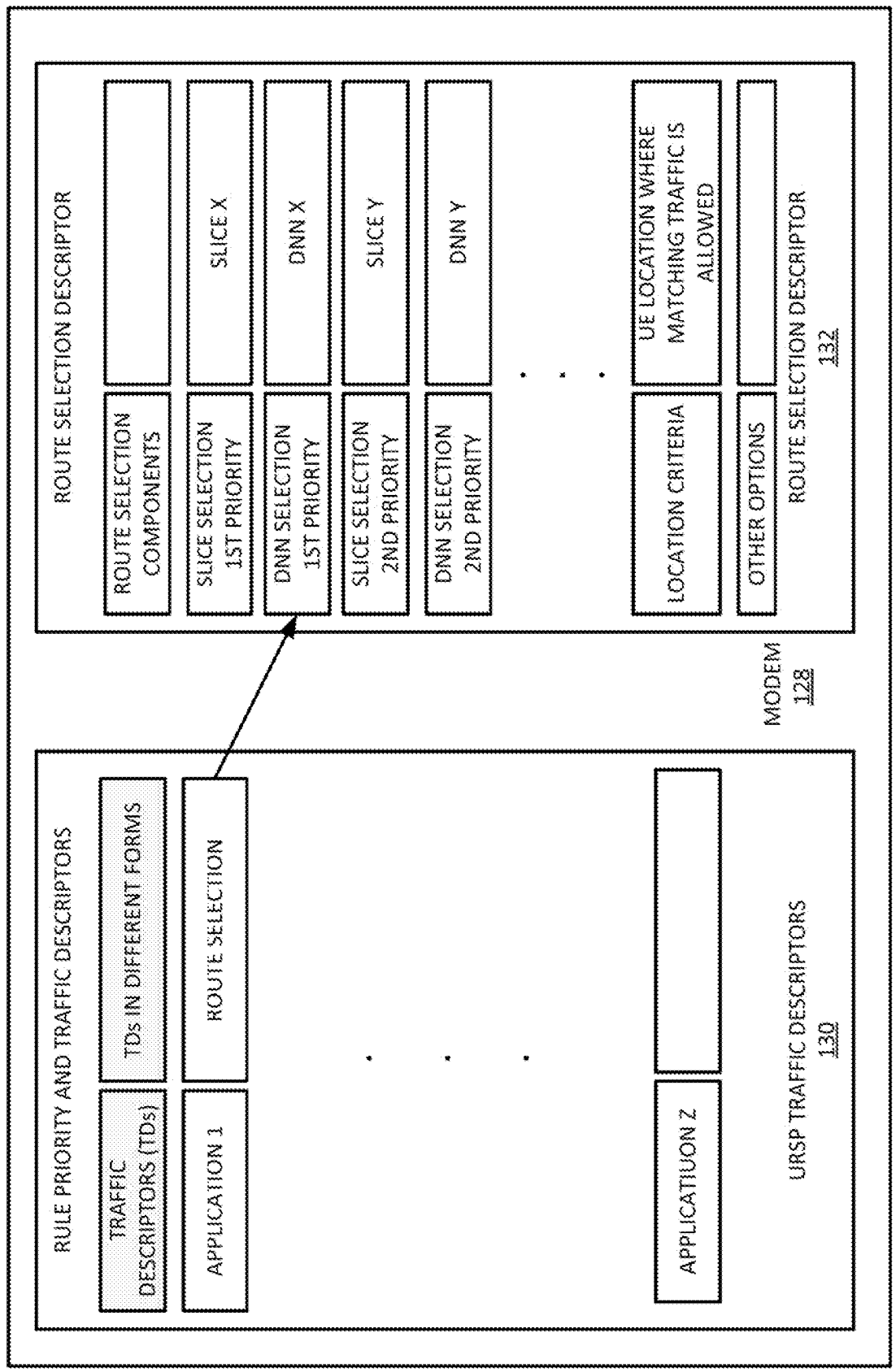
FIG. 2 illustrates the list of user equipment route selection policy traffic descriptors and the route selection descriptor of FIG. 1 in greater detail.

A simpler solution which reduces operational costs is to not configure all macro network RAN nodes with the localized network slice IDs. In this case, the UEs 112, 114, 116, and/or 118 may be configured with URSP rules related to applications that utilize localized network routes. In one example, these URSP rules are configured through the list of URSP traffic descriptors 130 and the route selection descriptor 132. FIG. 2 illustrates the list of URSP traffic descriptors 130 and the route selection descriptor 132 of FIG. 1 in greater detail.

As illustrated in FIG. 2 and described above, the URSP traffic descriptors 130 may describe the different types of traffic that applications 126 executing on the UE 114 may generate. Each type of traffic identified by a traffic descriptor may be associated with a route selection descriptor that describes how to prioritize and select available routes for that type of traffic.

For instance, for types of traffic that require differentiated RAN treatment via localized network routes, the route selection descriptor may rank a plurality of network routes in terms of priority, starting with a localized network route as the top-ranked or highest priority network slice (e.g., $1^{st}$ priority) and then optionally listing one or more macro network (non-localized) routes as lower-ranked or lower priority network routes (e.g., $2^{nd}$ priority, $3^{rd}$ priority, and so on). This will ensure that this type of traffic always establishes a PDU session with the localized network route when the UE 114 is in a location where the localized network route is available. When the UE 114 is in a location where the localized network route is not available, this type of traffic will establish a PDU session with the highest ranked priority network route (e.g., in the macro network).

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by server 110, or may be provided by AS 104 in conjunction with server 110. For instance, AS 104 and server 110 may be configured in a load balancing arrangement, or may be configured to provide for backups or redundancies with respect to each other, and so forth. Thus, these and other modifications are all contemplated within the scope of the present disclosure.

To further aid in understanding the present disclosure, FIG. 3 illustrates a flowchart of an example method 300 for establishing a protocol data unit session in accordance with the present disclosure. In particular, the method 300 provides a method by which a mobile device executing one or more network connected applications may vary the network route by which the mobile device connects to the network-side application server(s) with which the one or more network connected applications interact. In one example, the method 300 may be performed by a user endpoint device, such as one or more of the UEs 112, 114, 116, or 118 illustrated in FIG. 1. However, in other examples, the method 300 may be performed by another device, such as the processor 402 of the system 400 illustrated in FIG. 4. For the sake of example, the method 300 is described as being performed by a processing system.

The method 300 begins in step 302. In step 304, the processing system may detect that a user equipment device has moved to a location in a telecommunications network in which a first network route is available, where the first network route has a higher priority than a second network route with which an application executing on the user equipment device has established a current PDU session.

In one example, the user equipment device is a mobile device whose location may change over time (e.g., a mobile phone, a tablet computer, a smart watch, an Internet of Things device, a drone, a smart vehicle, or the like), and the processing system may be a component of the user equipment device.

As discussed above, a route may be identified by a combination of network slice ID (S-NSSAI) and DNN. Thus, the first network route may have a different slice ID and DNN than the second network route. Alternatively, the first network route and the second network route may share the same slice ID, but have different DNNs.

In one example, the first network route may comprise a localized network route that is only available in the location to which the user equipment device has moved. For instance, the first network route may be a localized network route that is available within the building and/or grounds of a hospital and is used by hospital applications to transmit patient data in a secure, low-latency manner. Thus, the application executing on the user equipment device may have established the current PDU session while the user equipment device was in a location in which the first network route was not available (e.g., outside of the hospital building and/or grounds). Thus, the first network route may be deemed a "higher priority" than the second network route in the sense that the first network route may provide improved quality of service relative to the second network route. However, as discussed in further detail below, the first network route could also be deemed a "higher priority" in the sense that the user equipment route selection policy rules for the application may explicitly prioritize PDU sessions with the first network route over PDU sessions with the second network route (e.g., a hospital application may be specifically configured to always use the localized network route for the hospital whenever possible).

In one example, the processing system may detect the availability of the first network route in the location when the 5G core network informs the user equipment device, upon movement of the user equipment device into the location, that the first network route is available. For instance, RAN nodes (e.g., gNodebs) in the location may be configured to track the movements of user equipment devices into, out of, and within the location and to inform newly detected user equipment devices of the available network routes within the location (along with the slice IDs and/or DNNs for these available network routes). Continuing the example above, a RAN node on the hospital may detect the new presence of the user equipment device in the hospital building and inform the user equipment device of the availability of the first network route. In another example, the one or more location criteria of the URSP rules of the user equipment device may be configured to detect when the user equipment device moves to a location in which the first network route is available.

In step 306, the processing system may determine whether the application should switch the PDU session to the first network route. As discussed above, the URSP traffic descriptors of the user equipment device may be configured to prioritize certain network routes for certain types of traffic for which the user equipment device is an endpoint. For instance, continuing the example above, the application executing on the user equipment device may be a hospital application that transmits and/or receives private and/or time-sensitive data, such as data about patient identities, diagnostics, health conditions, vital signs, and the like. In this case, the URSP traffic descriptors may be configured to indicate that the first network route should always be used to transmit data to and from the application, whenever the first network route is available (i.e., whenever the user equipment device is in a location where the first network route can be accessed). If the first network route is not available (e.g., the user equipment device is not in a location where the first network route can be accessed), then the route selection descriptors associated with the URSP traffic descriptors may specify a fallback or lower priority network route that may be used (e.g., the second network route).

In one example, the processing system may determine whether to switch the PDU session to the first network route automatically, e.g., based on application of the URSP traffic descriptors and route selection descriptors. In another example, however, the processing system may query the application and determine, based on a response from the application, whether to switch the PDU session to the first network route.

If the processing system determines in step 306 that the PDU session should not be switched to the first network route, then the method 300 may proceed to step 308. In step 308, the processing system may continue to support the application's PDU session established with the second network route.

If, however, the processing system determines in step 306 that the PDU session should be switched to the first network route, then the method 300 may proceed to step 310. In step 310, the processing system may support the application in switching the PDU session from the second network route to the first network route.

Switching an application to a higher priority route when the UE device is in 5G standalone (SA) RAN coverage typically will require moving the relevant application's traffic to a different PDU session with a different slice ID/DNN combination. This could equally apply when the 5G UE device is in a LTE/4G or 5G non-standalone (NSA) coverage area, and the UE device can switch the application's traffic to a higher priority route by moving the traffic to a different packet data network (PDN) session with a different access point name (APN). In this case, the APN used in the LTE/4G network will be the same as the DNN populated in the specific route descriptor of the URSP rule.

After the processing system has performed step 308 or step 310, the method 300 may end in step 312. However, the method 300 may be executed continuously and repeated by the processing system as necessary (e.g., whenever the availability of a new and/or higher priority network route is detected). Moreover, it should be noted that different applications executing on the user equipment device at the same time may establish PDU sessions with different network routes. For instance, a first application executing on the user equipment device may prioritize a first network route for PDU sessions, while a second application executing on the user equipment device may prioritize a second network route for PDU applications, or may not be permitted to access the first network route. As an example, a hospital application executing on a doctor's mobile phone may prioritize the establishment of PDU sessions with a localized network route for the hospital, as discussed in the example above. However, a streaming music application also executing on the doctor's mobile phone may prioritize the establishment of PDU sessions with a different (e.g., non-localized or macro network) network route, or may not be permitted to access the localized network route.

Thus, the method 300 may enable a 5G UE device to automatically inform applications executing on the UE device when higher priority routes are detected (e.g., become available upon the UE device moving to a new location) and to provide the applications with the option to move or switch their PDU sessions from their current routes to one of the higher priority routes. In one example, when the UE device moves to a location in which a new network route is available or allowed to be used by the UE device, the 5G core network may inform the UE device of the ID of the new network route.

This ability may prove useful in a variety of applications. One example is the implementation of 5G network slicing in localized areas like hospitals, where differentiated RAN treatment may be applied when UEs are within the RAN coverage of the localized area. For instance, a relatively high priority network route may be available to UE devices inside a hospital building. The high priority network route may be configured to support hospital applications that require secure, low-latency transmission of sensitive and/or urgent patient data, for instance. These hospital applications may also be used outside of the hospital building, but without any differentiation applied in the RAN nodes in the macro network outside of the hospital building. Thus, a hospital application on a doctor's UE device may establish a PDU session with the high priority network route while the UE device is inside the hospital building. However, if the UE device travels outside of the hospital building where the high priority network route is no longer supported (e.g., the doctor leaves the hospital building to get lunch), then PDU session may be switched to a lower priority network route that is available both inside and outside the hospital building.

Conversely, if the hospital application on the doctor's UE device first establishes the PDU session outside of the hospital building, where the high priority network route is not supported, then the PDU session may be initially established on the lower priority network route. However, according to conventional 5G network slice implementations, when the doctor's UE device later moves into the hospital building, the PDU session will remain on the lower priority network route even though the high priority network route is now available. This is because the PDU session was successfully established with the lower priority network route and the lower priority network route is still available within the hospital building. In other words, even if a higher priority network route is available in a location, conventional 5G network slice implementations will not inform a UE device that has moved into the location of the availability of the higher priority network route, as long as the network route that was used prior to moving into the location can still be supported in the location.

Examples of the present disclosure, however would inform the doctor's UE device of the availability of the high priority network route upon the movement of the doctor's UE device into the hospital building. The UE device may then inform the hospital application of the availability of the high priority network route and offer the hospital application the opportunity to switch the PDU session to the high priority network route. Similar implementations can provide improved service in other locations that utilize differentiated RAN treatment, such as factories, office buildings, college campuses, and the like. Thus, different localized network routes may be configured for different enterprise that conduct business in different locations.

Although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the method 300 may be implemented as the system 400. For instance, a user equipment device (such as might be used to perform the method 300) could be implemented as illustrated in FIG. 4.

As depicted in FIG. 4, the system 400 comprises a hardware processor element 402, a memory 404, a module 405 for establishing a protocol data unit session, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for establishing a protocol data unit session may include circuitry and/or logic for performing special purpose functions relating to the allocation of network resources. The input/output devices 406 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for establishing a protocol data unit session (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for establishing a protocol data unit session (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
   detecting, by a processing system including at least one processor, that a user equipment device has moved to a location in a telecommunications network in which a first network route is available, where the first network route has a higher priority than a second network route with which an application executing on the user equipment device has established a current protocol data unit session;
   determining, by the processing system, that the application should switch the current protocol data unit session to the first network route; and
   supporting, by the processing system, the application in switching the current protocol data unit session from the second network route to the first network route.

2. The method of claim 1, wherein the first network route was unavailable in a previous location in which the current protocol data unit session was established.

3. The method of claim 1, wherein the processing system is part of the user equipment device, and the user equipment device comprises a mobile device whose location changes over time.

4. The method of claim 1, wherein the first network route is a localized network route that is only available in the location to which the user equipment device has moved.

5. The method of claim 4, wherein the first network route is configured to carry data for an enterprise that conducts business in the location to which the user equipment device has moved.

6. The method of claim 1, wherein the location in the telecommunications network is within a coverage area of a standalone fifth generation cellular network.

7. The method of claim 6, wherein the first network route is identified by a first network slice identifier and a first data network name, and wherein the second network route is identified by a second network slice identifier and a second data network name.

8. The method of claim 7, wherein the first network slice identifier and the second network slice identifier comprise a same network slice identifier.

9. The method of claim 7, wherein the first data network name and the second data network name comprise different data network names.

10. The method of claim 7, wherein the first network slice identifier and the second network slice identifier comprise different network slice identifiers, and the first data network name and the second data network name comprise different data network names.

11. The method of claim 6, wherein the detecting comprises receiving a notification from the standalone fifth generation cellular network that has detected an entry of the user equipment device into the location, and wherein the notification informs the processing system that the first network route is available in the location.

12. The method of claim 6, wherein user equipment route selection policy rules of the user equipment device are configured to detect when the user equipment device moves to the location in which the first network route is available.

13. The method of claim 1, wherein the location in the telecommunications network is within a coverage area of at least one of: a non-standalone fifth generation cellular network, a fourth generation cellular network, or a long term evolution network.

14. The method of claim 6, wherein the first network route is identified by a first access point name, and the second network route is identified by a second access point name different from the first access point name.

15. The method of claim 1, wherein another application executing on the user equipment device continues another protocol data unit session with the second network route subsequent to the supporting.

16. The method of claim 15, wherein user equipment route selection policy traffic descriptors of the user equipment device are configured to prioritize the second network route for traffic associated with the another application executing on the user equipment device, even when the first network route is available.

17. The method of claim 15, wherein the another application executing on the user equipment device is not permitted to access the first network route.

18. The method of claim 1, wherein the location comprises at least one of: a hospital, a factory, a college campus, or an office building.

19. A non-transitory computer-readable medium storing instructions which, when executed by a processing system including at least one processor, cause the processing system to perform operations, the operations comprising:
   detecting that a user equipment device has moved to a location in a telecommunications network in which a first network route is available, where the first network route has a higher priority than a second network route with which an application executing on the user equipment device has established a current protocol data unit session;
   determining that the application should switch the current protocol data unit session to the first network route; and
   supporting the application in switching the current protocol data unit session from the second network route to the first network route.

20. A device comprising:
a processing system including at least one processor; and
a computer-readable medium storing instructions which, when executed by the processing system, cause the processing system to perform operations, the operations comprising:
- detecting that a user equipment device has moved to a location in a telecommunications network in which a first network route is available, where the first network route has a higher priority than a second network route with which an application executing on the user equipment device has established a current protocol data unit session;
- determining that the application should switch the current protocol data unit session to the first network route; and
- supporting the application in switching the current protocol data unit session from the second network route to the first network route.

* * * * *